S. Dickens, Jr.
Grain Screen.
No. 110,122. Patented Dec. 13, 1870.
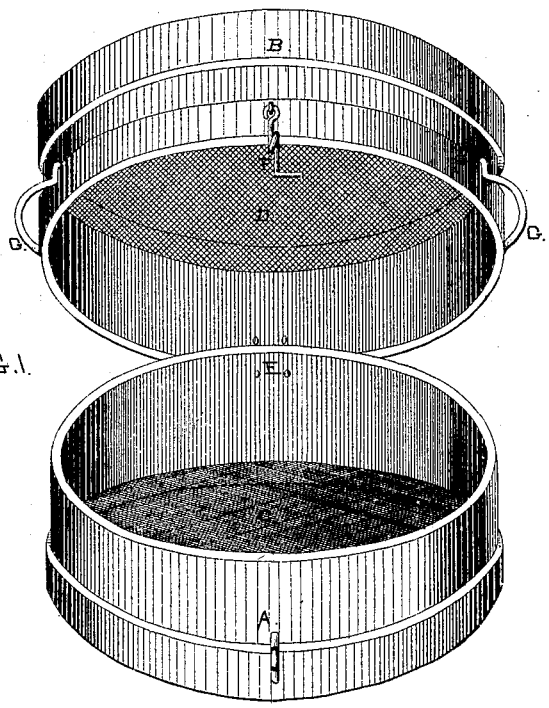
FIG. I.
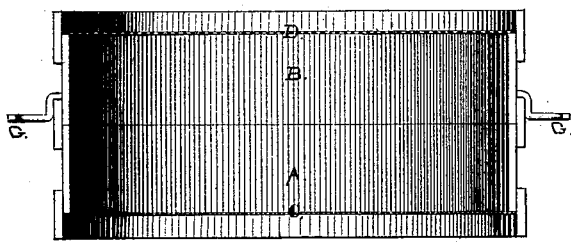
FIG. II.
INVENTOR.
Simon Dickens Jr
WITNESS:
J. B. Smith
W. M. Hornor

United States Patent Office.

SIMON DICKENS, JR., OF MILWAUKEE, WISCONSIN.

Letters Patent No. 110,122, dated December 13, 1870.

IMPROVEMENT IN OAT-CLEANERS.

The Schedule referred to in these Letters Patent and making part of the same.

I, SIMON DICKENS, Jr., of Milwaukee, in the county of Milwaukee, in the State of Wisconsin, have invented certain Improvements in Oat-Cleaners, of which the following is a specification.

Nature and Object of the Invention.

My invention is a double sieve, on one face coarse and on the other fine, so that the dirt may be sifted through and leave the oats or other grain, and then turn over, and the oats or grain will fall through and leave the chaff in the sieve, when the sieve can be opened and the straw or chaff be taken out.

Description of the Drawing forming part of this Specification.

Figure 1 is a perspective view of the sieves or oat-cleaner open, and
Figure 2 a sectional view of the oat-cleaner closed.

General Description.

A, the lower half of the oat-cleaner,
B, the upper half.
C, the lower or finest sieve
D, the upper or coarser sieve.
E, the hinges which hold the two sieves together.
F, fastener, with which the two sieves are held together.
G, the handles.

The operation of this oat-cleaner is, that the two sieves are opened and a quantity of oats or other grain is put in, and the grain is sifted on the lower or finer sieve at the bottom, through which the small dirt will pass; then turn the sieve over, and the grain will fall through the meshes of the coarser sieve, the large dirt and straw remaining in the sieve, when the sieve can be opened and the dirt and straw taken out.

Claim.

I claim as my invention—
An oat-cleaner, constructed with the upper and lower sieves A and B connected together, substantially as described.

SIMON DICKENS, JR.

Witnesses:
   J. B. SMITH,
   W. M. HORNOR.